United States Patent
Chu et al.

(10) Patent No.: US 9,692,701 B1
(45) Date of Patent: Jun. 27, 2017

(54) THROTTLING CLIENT INITIATED TRAFFIC

(71) Applicant: Google Inc., Mountain View, CA (US)

(72) Inventors: Han-Wei Chu, Sunnyvale, CA (US);
Vincent Gatto, Sunnyvale, CA (US);
Adam Corey Kalachman, San Jose, CA (US); Lukasz Bieniasz-Krzywiec, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 404 days.

(21) Appl. No.: 14/250,164

(22) Filed: Apr. 10, 2014

(51) Int. Cl.
*G06F 15/173* (2006.01)
*H04L 12/801* (2013.01)
*H04L 29/08* (2006.01)

(52) U.S. Cl.
CPC ........ *H04L 47/10* (2013.01); *H04L 29/08072* (2013.01)

(58) Field of Classification Search
CPC .......................... H04L 47/10; H04L 29/08072
USPC ......................................................... 709/223
See application file for complete search history.

(56) References Cited

U.S. PATENT DOCUMENTS

| | | | | |
|---|---|---|---|---|
| 4,506,360 A | * | 3/1985 | Kryskow, Jr. ......... | H04L 12/417 370/216 |
| 5,008,936 A | * | 4/1991 | Hamilton ............... | G06F 21/602 380/281 |
| 6,035,332 A | * | 3/2000 | Ingrassia, Jr. ....... | G06F 11/3495 707/E17.111 |
| 6,301,573 B1 | * | 10/2001 | McIlwaine ............... | G09B 5/00 706/16 |
| 6,342,908 B1 | * | 1/2002 | Bates .................... | G06F 3/0481 715/789 |
| 7,453,832 B2 | * | 11/2008 | Steer ...................... | H01Q 1/246 370/278 |
| 7,707,513 B2 | * | 4/2010 | Broda ............... | G06F 17/30905 715/783 |
| 7,839,289 B2 | * | 11/2010 | Chung .................. | G01S 5/0018 340/10.4 |
| 7,844,259 B2 | * | 11/2010 | Iwatsu ............. | G06F 17/30056 380/279 |

(Continued)

OTHER PUBLICATIONS

Hickson, Ian, "Web Storage" located at <http://www.w3.org/TR/webstorage/#the-storage-event>, Jul. 30, 2013, 20 pages.

*Primary Examiner* — Joseph Greene
(74) *Attorney, Agent, or Firm* — McDermott Will & Emery LLP

(57) ABSTRACT

In one aspect, a method includes electing one of a plurality of browser tabs at a client device as a master browser tab based on a timer value associated with each of the plurality of browser tabs, each of the plurality of browser tabs running web pages or web applications maintained by a common service being served by one or more servers, issuing a request from the master browser tab to the one or more servers, receiving a response to the request including a time value indicating the next time a request should be sent to the one or more servers at the master browser tab, updating, by the master browser tab, a local storage accessible by the plurality of browser tabs with the time value and resetting the timer value at each of the plurality of browser tabs according to the time value in response to receiving the response.

19 Claims, 4 Drawing Sheets

(56) References Cited

U.S. PATENT DOCUMENTS

| | | | |
|---|---|---|---|
| 8,898,487 B2* | 11/2014 | Pingili | G06F 1/3206 713/300 |
| 2005/0102358 A1* | 5/2005 | Gold | G06F 17/30867 709/204 |
| 2007/0256003 A1* | 11/2007 | Wagoner | G06F 17/3089 715/205 |
| 2009/0138438 A1* | 5/2009 | Wilson | G06F 17/30864 |
| 2009/0263777 A1* | 10/2009 | Kohn | G09B 7/00 434/350 |
| 2010/0031153 A1* | 2/2010 | Ortwein | G06F 9/542 715/733 |
| 2011/0066971 A1* | 3/2011 | Forutanpour | G06F 9/4443 715/788 |
| 2011/0167492 A1* | 7/2011 | Ghosh | G06F 9/54 726/23 |
| 2013/0132211 A1* | 5/2013 | Tsai | H04N 21/812 705/14.73 |
| 2014/0108644 A1* | 4/2014 | Zaents | H04L 43/045 709/224 |
| 2014/0229271 A1* | 8/2014 | Clapp | G06Q 30/0245 705/14.44 |
| 2014/0280699 A1* | 9/2014 | Mohapatra | H04L 67/02 709/217 |

\* cited by examiner

THROTTLING CLIENT INITIATED TRAFFIC

BACKGROUND

Users of a web browser may often have multiple browser tabs open for web pages served from a single web domain (e.g., an email client, search engine and news feed provided by the same web domain). The web domain is maintained by one or more remote servers, and the loaded pages constantly communicate with these remote servers in the background to implement features and/or functionality and improve usability. This constant communication initiated from multiple tabs increases the Query Per Second ("QPS") observed on the remote servers.

SUMMARY

The disclosed subject matter relates to a machine-implemented method including electing one of a plurality of browser tabs at a client device as a master browser tab based on a timer value associated with each of the plurality of browser tabs, each of the plurality of browser tabs running web pages or web applications maintained by a common service being served by one or more servers, the timer value indicating the next time that the browser tab will issue a request to the one or more servers. The method may further include issuing a request from the master browser tab to the one or more servers on behalf of the plurality of browser tabs. The method may further include receiving a response to the request at the master browser tab, the response including a time value indicating the next time a request should be sent to the one or more servers. The method may further include updating, by the master browser tab, a local storage accessible by the plurality of browser tabs with the time value. The method may further include resetting the timer value at each of the plurality of browser tabs according to the time value in response to receiving the response. Other aspects can be embodied in corresponding systems and apparatus, including computer program products.

The disclosed subject matter also relates to a system including one or more processors; and a machine-readable medium comprising instructions stored therein, which when executed by the processors, cause the processors to perform operations comprising determining a timer value for each of one or more browser tabs, the timer value indicating the next time that the browser tab will issue a request to a set of servers serving the content running at the browser tab. The operations may further include sending a request from a master browser tab of the one or more browser tabs to the set of servers on behalf of the one or more browser tabs, the master browser tab being selected according to the timer value associated with the master browser tab. The operations may further include receiving a response to the request at the master browser tab, the response including a time value indicating the next time a request should be sent to the one or more servers. The operations may further include updating, by the master browser tab, a local storage accessible by the one or more browser tabs with the time value. The operations may further include resetting the timer value at each of the plurality of browser tabs according to the time value in response to the update of the local storage. Other aspects can be embodied in corresponding systems and apparatus, including computer program products.

The disclosed subject matter also relates to a machine-readable medium including instructions stored therein, which when executed by a machine, cause the machine to perform operations including sending a request from a master browser tab of the one or more browser tabs to a set of servers on behalf of the one or more browser tabs, the master browser tab being selected according to a timer value for each of one or more browser tabs, the timer value indicating the next time that the browser tab will issue a request to a set of servers serving the content running at the browser tab. The operations may further include receiving a response to the request at the master browser tab, the response including a time value indicating the next time a request should be sent to the one or more servers. The operations may further include updating, by the master browser tab, a local storage accessible by one or more browser tabs with the time value. The operations may further include resetting the timer value at each of the plurality of browser tabs according to the time value in response to the update of the local storage. Other aspects can be embodied in corresponding systems and apparatus, including computer program products.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
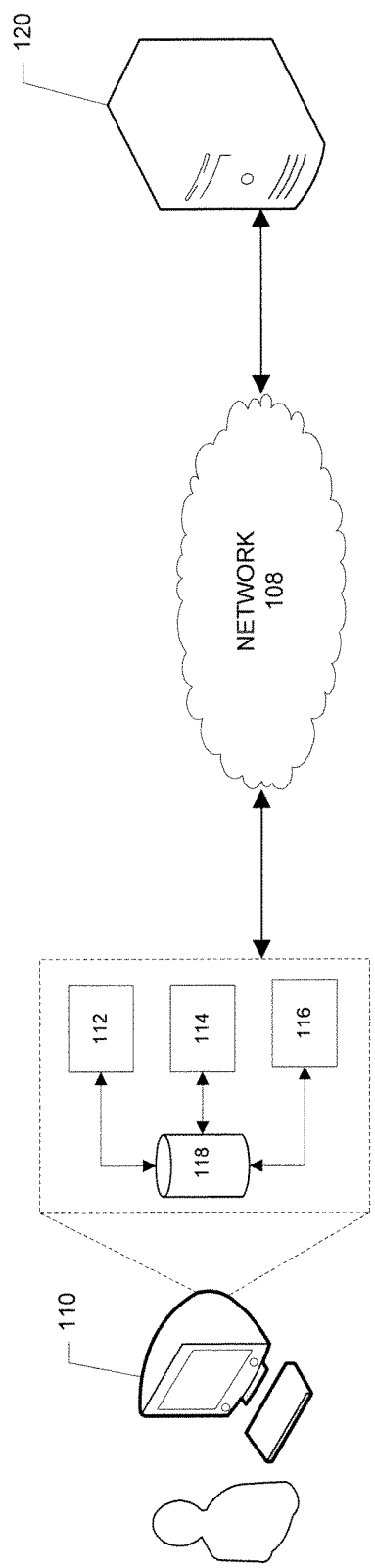
FIG. 1 illustrates an example client-server network environment, which provides for throttling client-initiated traffic across multiple browser tabs.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

A browser tab opened at a browser application of a client computer may send periodic requests to a server of a web domain or service generally referred to as "service" serving the web page loaded at the browser application. In some examples, where the browser application allows for multiple browser tabs or windows (hereinafter generally referred to as "browser tabs") to be open, each loaded page at a browser tab may individually send such requests to the respective server(s) of the service associated with the page. However, in various instances, a single service may provide different content and/or functionality, and a user of a client computer may have multiple browser windows and/or tabs opened for different web pages providing different content and/or services provided by the same web domain and/or maintained by the same server(s). The multiple requests to the servers may lead to an increased QPS observed at the server(s).

In some implementations, for example, depending on the nature of an implemented feature, viewing all open tabs as a whole and having any of them perform communications on behalf of all open tabs (e.g., all open tabs at the client device across multiple browser applications and/or within a single browser application) may be sufficient for maintaining the web pages and serving the requests from the tabs with regard to the features and/or functionalities. Accordingly, the present subject matter provides a synchronization mechanism that allows open browser tabs/windows to collaboratively reduce client-initiated traffic.

Typically, a request to the server(s) associated with service from each browser tab (e.g., with respect to the page/application running on the browser tab) is sent periodically. In one example, each browser tab served from the same server(s) has a handler running (e.g., a Java Script handler) that sends the requests to the server(s) at a request iteration. A request iteration, as used herein, refers to a periodic requests issued by each of the browser tabs. In some examples, a request to the servers is issued by a master handler of the one or more browser tabs for each request iteration. For example, for each request iteration, a first handler is elected as the master handler from the set of handlers running at each of the browser tabs in a distributed manner. In some implementations, the election is according to a timer value at each browser tab that defines the next time the handler of the browser tab is scheduled to send a request to the server. The browser tab/handler with the smallest timer value is then elected master and sends the request. The server, upon receiving the request, sends a response to the master handler. The master handler writes at least a time value portion of the response to a local storage. The updating of the local storage triggers all browser tabs/handlers to read the time value from the local storage and reset their timer values. A new election in performed according to the new timer values for the next request iteration.

In this manner, the requests to the server are not redundantly sent by each individual browser and instead, all requests are handled by a single request on behalf of all browser tabs running pages and/or applications served by a single service or set of servers.

FIG. 1 illustrates an example client-server network environment, which provides for throttling client-initiated traffic across multiple browser tabs. A network environment 100 includes a number of clients (e.g., browser tabs/windows) 112, 114, 116 communicably connected to a server 120 by a network 108.

Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like. The network 108 can include, for example, any one or more of a personal area network (PAN), a local area network (LAN), a campus area network (CAN), a metropolitan area network (MAN), a wide area network (WAN), a broadband network (BBN), the Internet, and the like.

In some example implementations, clients 112, 114, 116 may be running at a web browser at a client device 110, and may each run a web page or web application through the browser application. In one example, clients 112, 114 and 116 each represent a browser tab running a service maintained by the same service and/or server(s). The client device 110, in some examples, can be one of several computing devices such as laptop or desktop computers, smartphones, PDAs, portable media players, tablet computers, or other appropriate computing devices. In some examples, the client device includes a local storage 118. In some implementations, clients 112, 114 and 116 are communicably coupled to the local storage 118 at client device 110.

According to some aspects, server 120 can be any system or device having a processor, a memory and communications capability for hosting various services or web domains and/or for generating responses to requests from web pages and/or applications running at one or more client devices (e.g., client device 110 and clients 112, 114, 116). In some example aspects, server 120 can be a single computing device such as a computer server. In other implementations, server 120 can represent more than one computing device working together to perform the actions of a server computer (e.g., cloud computing). Server 120 may be coupled with various remote databases or storage services and/or other remote servers.

Communications between clients 112, 114 and 116 at client device 110 and server 120 may be facilitated through various communication protocols. In some aspects, clients 112, 114, 116 and server 120 may communicate wirelessly through a communication interface (not shown), which may include digital signal processing circuitry where necessary. The communication interface may provide for communications under various modes or protocols, including for example the HTTP and/or XML protocol.

Figure 2:
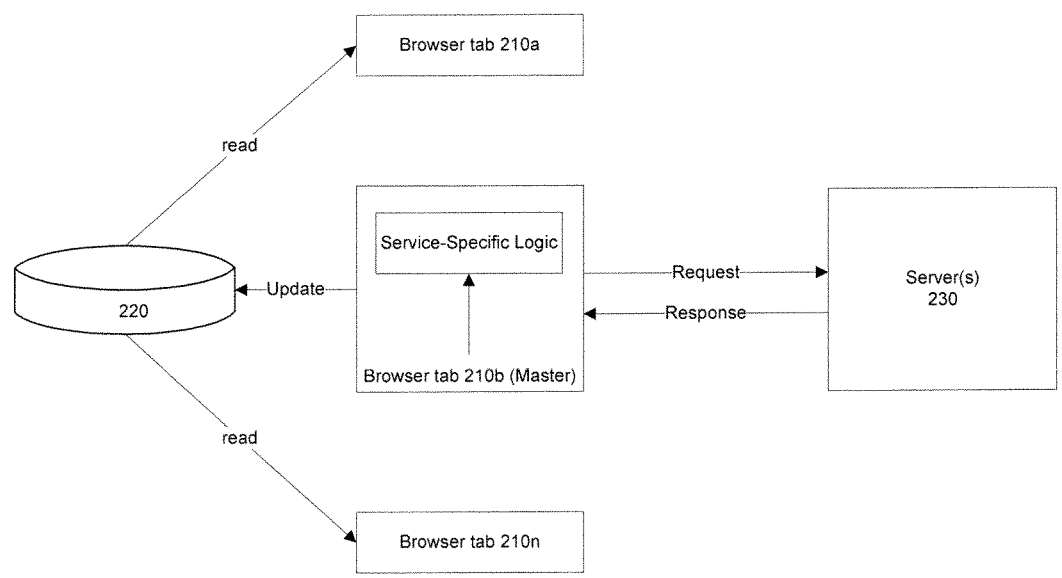
FIG. 2 illustrates an example block diagram of a system for facilitating throttling client-initiated traffic across multiple browser tabs.

FIG. 2 illustrates an example block diagram of a system 200 for facilitating throttling client-initiated traffic across multiple browser tabs. The system includes a set of browser tabs 210a-n, each running a web page or web application at a browser application (e.g., running on client device 110) and communicably coupled to a local storage 220 (e.g., at client device 110). In the example diagram, browser tab 210b is designated as the master and in communication with the server 230, at least for a first request iteration.

In one example, the master browser tab 210b sends a request to the server 230. In one example, the request comprises an XMLHTTPRequest sent to an API endpoint on server 230. In some examples, the request may include additional information such as cookies, and/or diagnostic data. Server 230, upon receiving the request, may construct an HTTP response to send back to the browser. The response may include a $T_{next}$ value indicting the number of minutes into the future that the browser should perform the next request. The response, in some examples, may further include service-specific information.

The master browser tab 210b be receives the response and performs any service-specific logic. The master browser tab 210b further updates local storage 220 with the value for $T_{next}$ value received as part of the response from server 230. The update event triggers all other browser tabs 210a and c-n to be notified of the update. The browser tabs, upon being notified, may access local storage 220 to read the stored $T_{next}$ value. In one example, each browser tab generates a new random value $T_{wait}$ and adds the value $T_{wait}$ and $T_{next}$. The total is designated as the timer value for the browser, and represents the number of minutes the browser tab will wait until issuing a request to the server. As the $T_{wait}$ value is individually generated at each browser tab 201a-n, the timer value is unique to each browser tab and is used to elect the master browser tab for the next request iteration.

Figure 3:
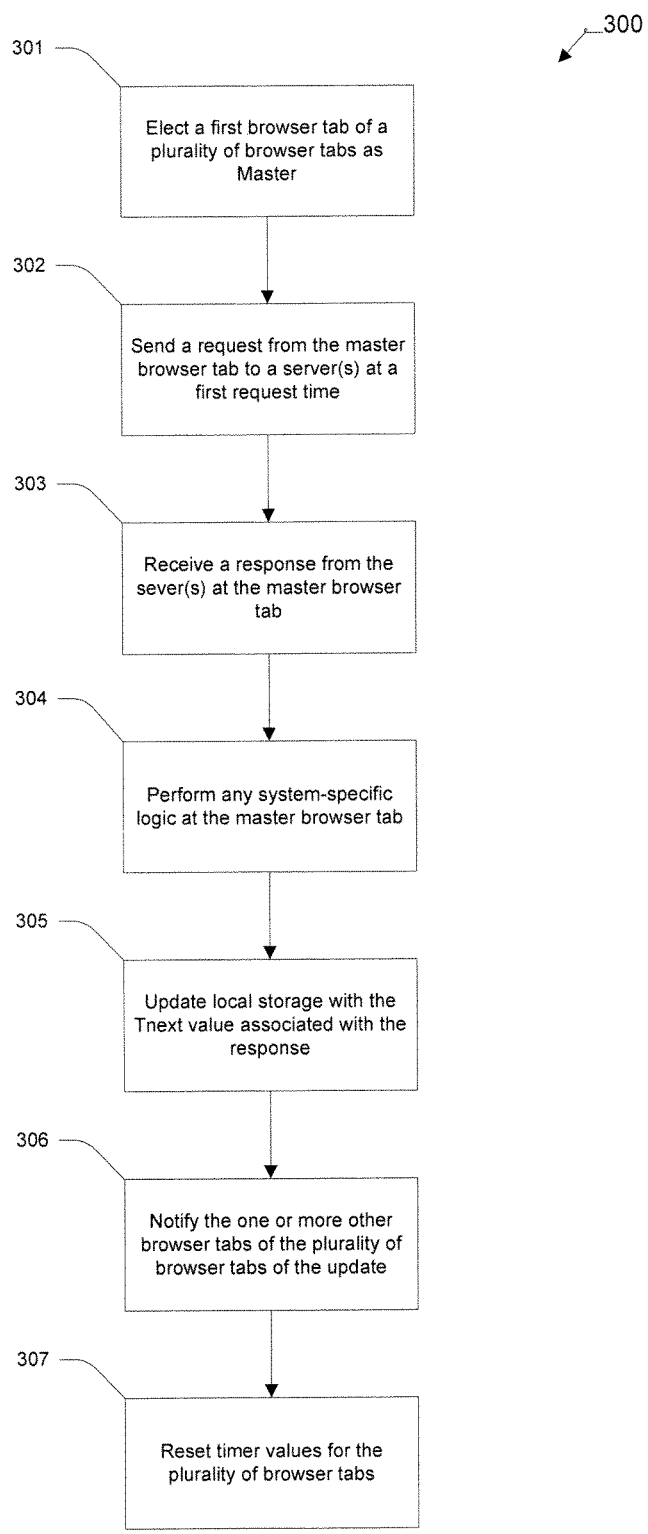
FIG. 3 illustrates a flow diagram of an example process for facilitating throttling client-initiated traffic across multiple browser tabs.

FIG. 3 illustrates a flow diagram of an example process 300 for facilitating throttling client-initiated traffic across multiple browser tabs. In step 301, a first browser tab of a plurality of browser tabs (e.g., browser tabs 210a-n) running web pages or web applications maintained by a first server (server 220) is elected as master. The election process includes determining a timer value calculated for each of the plurality of browser tabs during a request iteration. In one example, the election may include determining a timer value, the timer value indicating a delay period before a browser tab is scheduled to send a request to the first server. In one example, the timer value is defined as the sum of $T_{next}$ and $T_{wait}$.

In one example, $T_{next}$ is a value generated by the first server representing the number of minutes before the next request to the server should be issued. In one example, $T_{next}$ is provided to the plurality of browsers in the response sent in the previous request iteration. In one example, the value for $T_{next}$ may be initially set to zero or other default value during the first request iteration. $T_{wait}$ may be generated individually by each of the plurality of browser tabs, for example, using a random number generator. In another example, a single number generator may randomly assign $T_{wait}$ values for each of the plurality of browser tabs.

In some examples, the browser tab with the smallest timer value is elected master. In some examples, the election occurs because the browser tab with the smallest timer value during a request iteration is the first browser tab to issue a request to the server, and thus elected master.

In step 302, the first browser tab sends a request to the first server. In one example, the request from the master browser tab is sent according to the timer value associated with the master browser tab. In one example, each browser tab has a handler (e.g., JavaScript handler) running in the browser tab. The handler in the master browser tab sends the request, according to some implementations. In some examples, the request may comprise an XMLHTTPRequest. In one example, the request may be sent to an API endpoint on the server. In one example, the request may include additional information (e.g., browser information shared by the plurality of browser tabs, or stored locally by one or more browser tabs in a local storage at the client device). In one example, the additional information may include cookies, diagnostics information and/or other information.

In step 303, a response is received from the first server. In one example, the first server constructs a response (e.g., an HTTP response) to send back to the browser (e.g., through the master browser tab). In one example, the response includes necessary service-specific information and/or a $T_{next}$ value.

In step 304, the master browser tab (e.g., the handler) performs any service-specific logic based on the response, and in step 305, the master browser tab (e.g., the handler) updates a local storage coupled to and accessible by the plurality of browser tabs with the $T_{next}$ value. In step 306, the other browser tabs are notified of the update to the local storage. The update, in some examples, triggers a notification to all other browser tabs (e.g., handlers of all browser tabs), which read the $T_{next}$ value from the local storage.

In step 307, the timer values for the plurality of browser tabs are reset in response to the update at the local storage. In one example, each browser tab calculates a new timer value according to the $T_{next}$ value stored in local storage and a $T_{wait}$ value randomly generated. The process next returns to step 301 and proceeds to the next request iteration.

While the above examples are described with respect to a single service, in one example, multiple services running in a browser application (or multiple browser applications at the client device) may use throttling simultaneously. In one example, each service (e.g., domain) may be associated with a local storage, and throttling between browser tabs contacting the service may be facilitated through the local storage associated with the service at the client device. In one example, each service may customize the throttling library behavior by specifying an application name, used to identify the local storage entry for the service (e.g., used as part of a key), a path to an API endpoint, minimum/maximum next request time used to validate $T_{next}$ in a server response or local storage, and a maximum wait time used in the election and/or to generate $T_{wait}$.

While the above throttling process is described with respect to browser tabs, in some examples, throttling may also be facilitated between multiple iframes running at a browser application (e.g., within the same or different browser tabs). A copy of the throttling service may be copied into each iframe. In some examples, each iframe has a handler and acts as a separate client (e.g., similar to a browser tab) for the purposes of throttling. For example, where multiple iframes contact the same service, the handler within each iframe may generate a timer value, and master election may occur between iframes. The handler for each iframe may write into the local storage for the specific service, and other iframes contacting the same service may read from the local storage. Thus, by associating each iframe with a handler, the iframes behave similar to browser tabs. In one example, throttling may be performed across browser sessions, wherein a user may close and reopen a browser within affecting the throttling state.

In various examples, various errors may occur on the client-side (e.g., at the client device). For example, the server response received may be malformed, incomplete and/or empty. For example, the $T_{next}$ value may be missing from the response and/or not be within a valid range defined by the service, and/or additional information required by a service may not be provided within the response. In another example, the local storage information may be malformed, incomplete and/or empty. For example, the value $T_{next}$ may be missing from the local storage and/or the local storage may not be supported by the client. In another example, a response error and/or timeout may occur. These errors may be detected, for example, either by the shared throttling system and/or by each service independently, and the request may be resent. In one example, if it is determined that the value of $T_{next}$ is missing and/or invalid, a default value may be assigned to $T_{next}$. In one example, server side errors may also occur. For example, the server may send malformed, incomplete or empty responses or stop responding. In some examples, each browser tab (regardless of being elected master) may periodically contact the server(s) to make sure that such errors are not occurring on the server side. In one example, when server side errors are detected, the browser tab may refrain from sending further requests to the server.

Many of the above-described features and applications are implemented as software processes that are specified as a set of instructions recorded on a computer readable storage medium (also referred to as computer readable medium).

When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
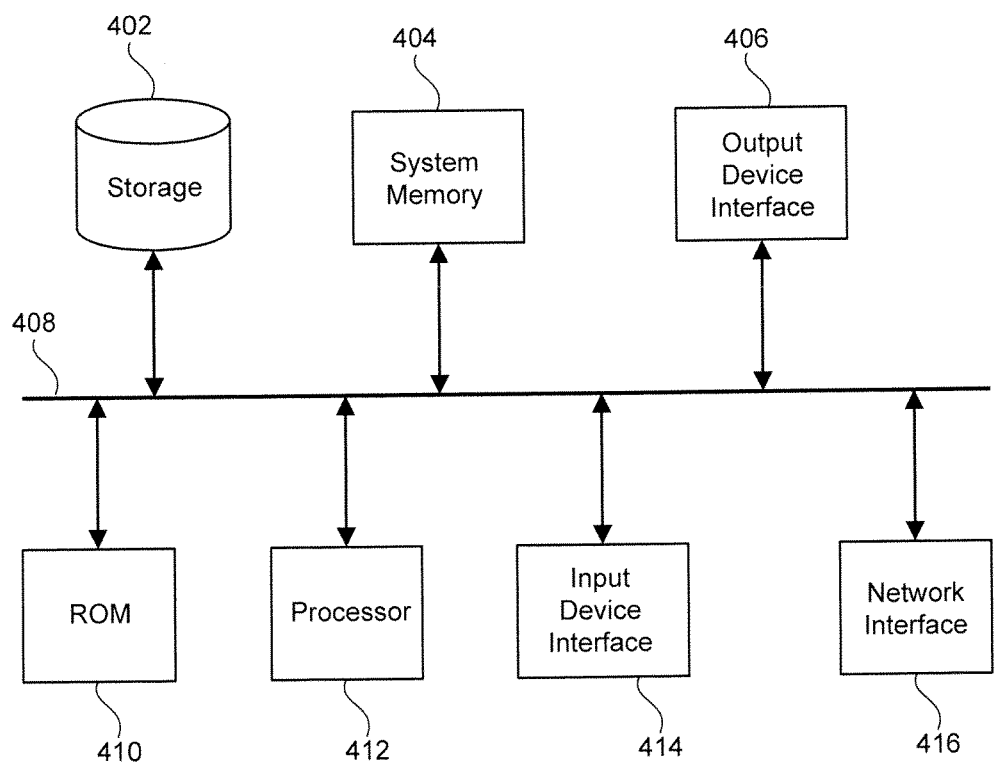
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for facilitating throttling client-initiated traffic across multiple browser tabs according to various implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touch-screen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A machine-implemented method, comprising: electing one of a plurality of browser tabs at a client device as a master browser tab based on a respective timer value generated by each of the plurality of browser tabs, each of the plurality of browser tabs running web pages or web applications maintained by a common service being served by one or more servers, the respective timer value indicating a next time that each of the plurality of browser tabs will issue a request to the one or more servers; issuing the request from the master browser tab to the one or more servers on behalf of the plurality of browser tabs when the respective timer value of the master browser tab expires; receiving a response to the request at the master browser tab from the one or more servers, the response from the one or more servers including an update time value indicating the next time the request should be sent to the one or more servers; updating, by the master browser tab, a local storage accessible by the plurality of browser tabs with the update time value that indicates the next time the request should be sent to the one or more servers; and resetting, responsive to receiving the response, the respective timer value at each of the plurality of browser tabs by reading the update time value from the local storage, generating a respective random wait time value, and resetting the respective timer value as a function of the update time value with respect to the generated respective random wait time value.

2. The method of claim 1, wherein the master browser tab is associated with a smallest respective timer value relative to the plurality of browser tabs.

3. The method of claim 1, wherein the response further includes service-specific information.

4. The method of claim 1, further comprising:
performing service-specific logic by the master browser tab in response to receiving the response.

5. The method of claim 1, wherein the request is sent to an API end point associated with the one or more servers.

6. The method of claim 1, wherein the request includes diagnostic information regarding the plurality of browser tabs.

7. The method of claim 1, wherein the request includes cookies associated with the plurality of browser tabs.

8. The method of claim 1, wherein the plurality of browser tabs are running at a browser application at the client device.

9. The method of claim 1, further comprising:
responsive to updating, by the master browser tab, the local storage with the update time value received from the one or more servers, re-electing the master browser tab of the plurality of browser tabs based at least in part on the reset respective timer value generated by each of the plurality of browser tabs for sending a subsequent request to the one or more servers.

10. A system comprising: one or more processors; and a machine-readable medium comprising instructions stored therein, which when executed by the processors, cause the processors to perform operations comprising: determining a respective timer value for each of one or more browser tabs, the respective timer value indicating a next time that each of the one or more browser tabs will issue a request to a set of servers serving content running at each of the one or more browser tabs; sending the request from a master browser tab of the one or more browser tabs to the set of servers on behalf of the one or more browser tabs when the respective timer value of the master browser tab expires, the master browser tab being selected from the one or more browser tabs according to the respective timer value associated with the master browser tab; receiving a response to the request at the master browser tab, the response including an update time value indicating the next time the request should be sent to the set of servers; updating, by the master browser tab, a local storage accessible by the one or more browser tabs with the update time value; and resetting, responsive to updating the local storage, the respective timer value at each of the one or more browser tabs by reading the update time value from the local storage, generating a respective random wait time value, and resetting the respective timer value as a function of the update time value with respect to the generated respective random wait time value.

11. The system of claim 10, wherein the respective timer value for each of the one or more browser tabs is calculated according to a previous update time value provided by the set of servers during a previous response and stored in the local storage.

12. The system of claim 10, wherein the master browser tab is associated with the respective timer value that indicates an earliest time for sending the request to the set of servers.

13. The system of claim 10, wherein the response further includes service-specific information.

14. The system of claim 13, the operations further comprising:
performing service-specific logic based on the response by the master browser tab in response to receiving the service-specific information.

15. The system of claim 10, wherein the request includes diagnostic information regarding the one or more browser tabs.

16. The system of claim 10, wherein the request includes cookies associated with the one or more browser tabs.

17. A non-transitory machine-readable medium comprising instructions stored therein, which when executed by a machine, cause the machine to perform operations comprising: sending a request from a master browser tab of one or more browser tabs to a set of servers on behalf of the one or more browser tabs, the master browser tab being selected according to a respective timer value for each of one or more browser tabs, the respective timer value indicating a next time that the browser tab will issue the request to the set of servers serving content running at the browser tab, wherein the master browser tab sends the request when the respective timer value for the master browser tab expires; receiving a response to the request at the master browser, the response including an update time value indicating the next time the request should be sent to the set of servers; updating, by the master browser tab, a local storage accessible by one or more browser tabs with the update time value; and
resetting, responsive to updating the local storage, the respective timer value at each of the one or more browser tabs based at least in part on the update time value by reading the update time value from the local storage, generating a respective random wait time value, and resetting the respective timer value as a function of the update time value with respect to the generated respective random wait time value.

18. The machine-readable medium of claim 17, wherein the master browser tab is associated with the respective timer value that indicates an earliest time for sending the request to the set of servers.

19. The machine-readable medium of claim 17, the operations further comprising:
performing service-specific logic based on the response by the master browser tab in response to receiving service-specific information from the set of servers as part of the response.

* * * * *